United States Patent [19]

McAuliffe et al.

[11] Patent Number: 5,311,749
[45] Date of Patent: May 17, 1994

[54] TURBINE BYPASS WORKING FLUID ADMISSION

[75] Inventors: Christopher McAuliffe, Windsor; John F. Maher, Jr., Enfield, both of Conn.

[73] Assignee: United Technologies Corporation, Hartford, Conn.

[21] Appl. No.: 862,883

[22] Filed: Apr. 3, 1992

[51] Int. Cl.⁵ .................... F25D 9/00; F01D 17/00
[52] U.S. Cl. .................... 62/402; 62/86; 62/87; 62/172; 62/401; 60/39.07; 415/12; 415/22
[58] Field of Search .................... 62/86, 87, 172, 401, 62/402; 60/39.07; 415/12, 22

[56] References Cited

U.S. PATENT DOCUMENTS

| | | | |
|---|---|---|---|
| 1,977,036 | 12/1932 | Biggs | 253/117 |
| 2,265,112 | 8/1934 | Davies | 230/127 |
| 3,699,777 | 10/1972 | Rannenberg | 62/172 |
| 4,141,672 | 2/1979 | Wieland et al. | 415/202 |
| 4,245,953 | 1/1981 | Milton et al. | 415/144 |
| 4,312,191 | 1/1982 | Bigaini | 62/172 X |
| 4,334,411 | 6/1982 | Payne | 62/172 X |
| 4,374,469 | 2/1983 | Rannenberg | 62/172 X |
| 4,430,867 | 2/1984 | Warner | 62/402 |
| 4,550,573 | 11/1985 | Rannenberg | 62/172 |
| 4,580,406 | 4/1986 | Nims | 62/87 |
| 4,963,174 | 10/1990 | Payne | 62/172 X |
| 5,056,335 | 10/1991 | Renninger et al. | 62/402 |
| 5,086,622 | 2/1992 | Warner | 62/88 |
| 5,113,194 | 7/1992 | Army, Jr. et al. | 62/402 X |
| 5,113,670 | 5/1992 | McAuliffe et al. | 62/402 |

*Primary Examiner*—Henry A. Bennett
*Assistant Examiner*—C. Kilner
*Attorney, Agent, or Firm*—William W. Habelt

[57] ABSTRACT

An air cycle machine (10) has a first stage turbine (60) mounted to a central portion of a common shaft (12), a compressor (50) mounted to the central portion of the shaft (12), a second stage turbine (30) mounted to a first end of the shaft (12), and a fan (40) mounted to a second end of the shaft (12), all for rotation therewith about a longitudinal axis (14). The first and second stage turbines (60, 30) are operative to extract energy from a flow of compressed air for driving the shaft (12), and the fan (40) and the compressor (50), in rotation about the axis (14). A bypass air discharge nozzle (20) is disposed coaxially with the turbine shroud (32) of the outboard turbine (30) at the outlet (134) thereof or downstream thereof at the discharge end (38) of the turbine diffuser (36) so as to receive in a central region the turbine exhaust (3) discharging from the turbine (30) and to define an annular flow inlet (28) through which a flow of bypass air (5) is directed into an outer circumferential region thereof to flow substantially parallel to and about the cooled expanded conditioning air exhaust flow (3) discharged from the turbine (30).

5 Claims, 3 Drawing Sheets

TURBINE BYPASS WORKING FLUID ADMISSION

TECHNICAL FIELD

The present invention relates to turbomachine systems in general and in particular to turbomachine systems wherein a portion of the working fluid is bypassed around the turbine and thereafter admitted to the turbine exhaust fluid. The present invention is particularly suited for use in air conditioning systems of the type utilized on environmental control systems to cool and dehumidify air for supply to an aircraft cabin or the like.

BACKGROUND ART

Conventional aircraft environmental control systems incorporate a turbomachine, commonly referred to as an air cycle machine or an air cycle cooling machine, for use in cooling and dehumidifying air for supply to the aircraft cabin for occupant comfort. Such air cycle machines may comprise two, three or four wheels, including at least one compressor and at least one turbine, disposed at axially spaced intervals along a common shaft. The turbine or turbines, as the case may be, extract energy from a working fluid passing therethrough for driving the compressor and any other wheels mounted to the shaft, such as a fan or an additional compressor. The three wheels are supported for rotation about the axis of the shaft on one or more bearing assemblies disposed about the drive shaft, such as a pair of spaced bearing assemblies, one bearing assembly disposed intermediate each pair of adjacent spaced wheels. Although the bearing assemblies may be ball bearings or the like, hydrodynamic film bearings, such as gas film foil bearings, are often utilized on state-of-the-art air cycle machines.

On aircraft powered by turbine engines, the air to be conditioned in the air cycle machine is typically compressed air bled from one or more of the compressor stages of the turbine engine. In conventional systems, this bleed air is passed through the air cycle machine compressor wherein it is further compressed, thence passed through a condensing heat exchanger to cool the compressed air sufficiently to condense moisture therefrom thereby dehumidifying the air before expanding the dehumidified compressed air in the turbine or turbines, as the case may be, of the air cycle machine to both extract energy from the compressed air so as to drive the shaft and also to cool the expanded turbine exhaust air for use as the cooling fluid in the aforementioned condensing heat exchanger before it is supplied to the cabin as conditioned cooling air. The compressed bleed air being supplied to the compressor of the air cycle machine is typically precooled by passing it through a precooling heat exchanger in heat exchange relationship with ambient air drawn through the precooling heat exchanger by the fan of the air cycle machine.

As aircraft environmental control systems must be capable of delivering conditioned air to the aircraft passenger and crew cabins over a wide range of operating conditions, it is necessary during portions of the operational envelope to bypass a portion of the working fluid bled to the system about the turbine, or at least one turbine in multi-stage turbine machines, and thereafter readmit the bypass fluid with the turbine exhaust, i.e. that portion of the working fluid passed through the turbine. For example, in commonly assigned U.S. Pat. No. 4,430,867, there is disclosed an air cycle refrigeration system for cooling and ventilating an aircraft enclosure wherein provision is made for bypassing a portion of the system working fluid, i.e. compressed air bled from the aircraft engine compressor, about the turbine of a three wheel air cycle machine under certain operating conditions, and thereafter readmitting this bypass air into the turbine exhaust being directed to the aircraft enclosure at a point downstream of the turbine. In this system, a portion of relatively warm air may be bypassed around both the compressor and turbine of the air cycle machine and subsequently remixed therewith at a location downstream of the turbine and upstream of a cabin air recirculation heat exchanger so as to raise the temperature of the mixed air stream sufficiently to prevent icing in the cabin air recirculation heat exchanger.

The environmental control system disclosed in commonly assigned U.S. Pat. No. 5,086,622 operates in a condensing cycle mode, employing a four wheel air cycle having a first stage turbine and a second stage turbine, which together serve to extract energy from the system working fluid, again engine compressor bleed air, and condition the working fluid for supply to the aircraft enclosure. Water vapor is removed from the compressed air before it is expanded in the first turbine by passing the incoming air through a condensing heat exchanger in heat exchange relationship with the chilled exhaust from the first turbine so as to condense moisture from the incoming air. After passing through the condensing heat exchanger, the first turbine exhaust, having been warmed via absorption of the heat given up by the condensing water vapor, is expanded through the second turbine. Under certain operating conditions, a portion of the working fluid is bypassed about the second turbine and thereafter remixed with the exhaust from the second turbine being directed to the aircraft enclosure at a location downstream of the second turbine. Commonly, the relatively warm bypass air has been perpendicularly introduced into the chilled turbine exhaust downstream of the turbine outlet so as to create flow turbulence in order to facilitate mixing of the bypass air with the turbine exhaust air. While effective in improving mixing, such perpendicular bypass air introduction is often accompanied by undesirable noise generated by the flow turbulence during the mixing of the flow streams.

Under some operating conditions, the turbine exhaust may be cooled to such a point that residual moisture remaining in air supplied thereto condenses on the walls of the turbine outlet shroud and outlet duct work upstream of the location of the admission of the turbine bypass air, thereby causing undesirable icing on such upstream surfaces. One method of addressing icing of the turbine outlet shroud and downstream exhaust ductwork is to pass a flow of relatively warm air over the external surfaces of the shroud and the turbine exhaust ductwork. For example, U.S. Pat. No. 4,580,406 discloses an air cycle environmental control system wherein a first portion of the relatively warm bleed air being supplied to the compressor of the air cycle machine is first passed over the outside of the turbine outlet shroud to heat the shroud before being supplied to the air cycle machine compressor. A second portion of the relatively warm bleed air being supplied to the compressor of the air cycle machine bypasses the air cycle machine altogether and is passed into a plenum chamber disposed about the turbine exhaust duct, thereby heating the outside surface of the wall of the turbine exhaust downstream. The bypass air admitted to this plenum chamber is vented therefrom into the turbine exhaust air immediately upstream of a condensing heat exchanger disposed downstream of the turbine outlet through which the chilled turbine exhaust passes in heat exchange relationship with the compressed bleed air being passed to the turbine for expansion therein.

DISCLOSURE OF INVENTION

It is an object of the present invention to provide a turbomachine having means for introducing a flow of turbine bypass air into the turbine exhaust air as the turbine exhaust air exits the turbine without creating excessive noise.

It is an object of a particular embodiment of the present invention to provide an air cycle machine having means for introducing the bypass air into the turbine exhaust air as the turbine exhaust air exits the turbine without creating noise and in such a manner as to inhibit icing of the turbine outlet diffuser and any downstream exhaust duct into which the turbine exhaust discharges.

The turbomachine of the present invention has a turbine wheel mounted on one end of a shaft means for rotation therewith about a longitudinal axis, the turbine wheel housed within a turbine shroud having an outlet through which the turbine exhaust discharges in an axial direction. In accordance with the present invention, a bypass air discharge nozzle is disposed coaxially with the turbine shroud at or downstream of the outlet of the turbine shroud so as to receive in a central region thereof the turbine exhaust discharging through the outlet of the turbine shroud and to define an annular flow inlet through which a flow of bypass air is directed into an outer circumferential region thereof to flow substantially parallel to the turbine exhaust flow passing through the central region thereof.

BRIEF DESCRIPTION OF DRAWING

These and other objects, features and advantages of the present invention will become more apparent in light of the detailed description of the embodiments thereof illustrated in the accompanying drawing, wherein.

BEST MODE FOR CARRYING OUT THE INVENTION

Figure 1:
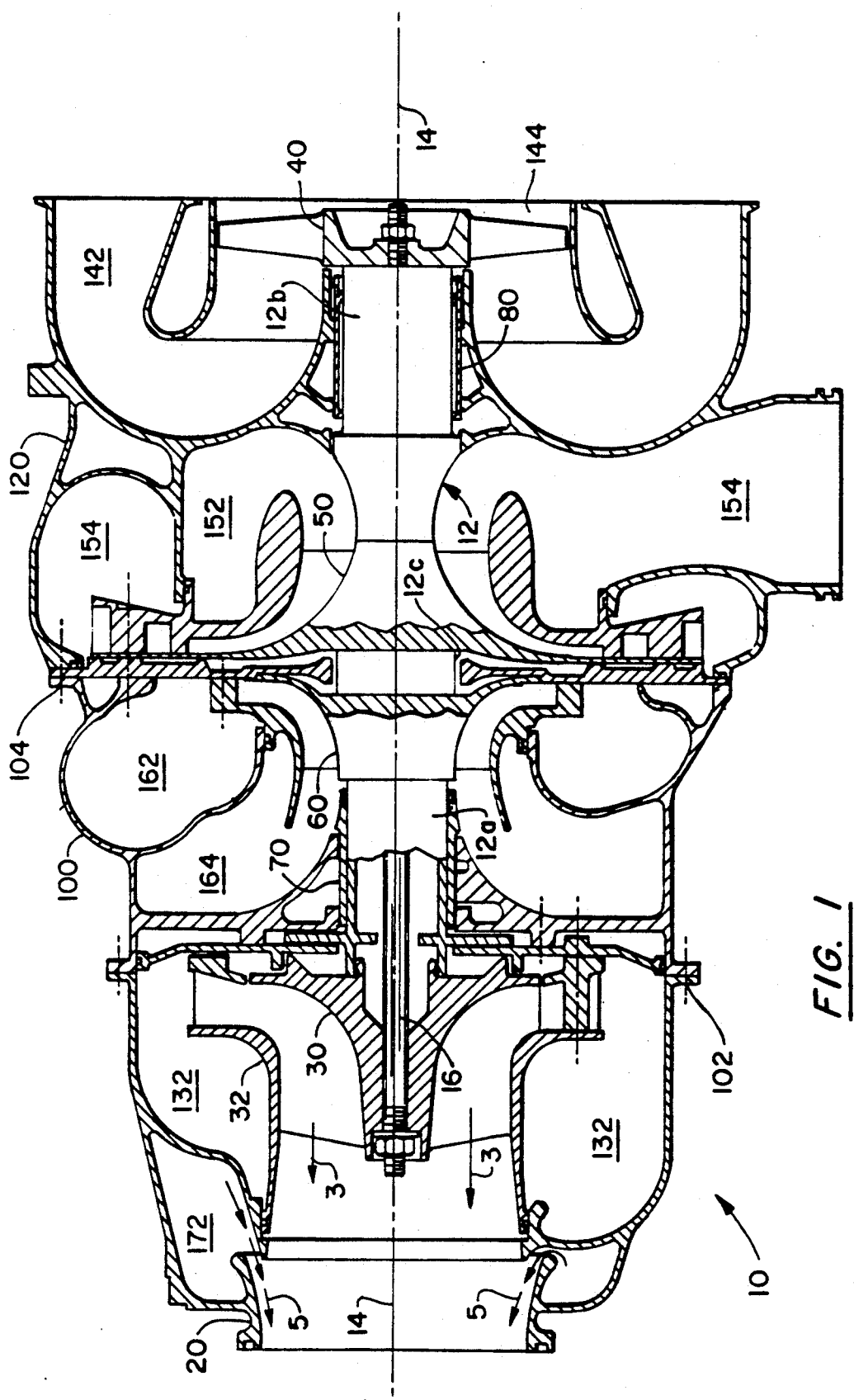
FIG. 1 is a side elevational view, partly in section, of an air cycle machine of the present invention.

Referring now to FIG. 1, there is depicted therein a turbomachine comprising an air cycle machine 10 having a turbine bypass flow admission nozzle 20 for introducing a bypass flow of working fluid substantially parallelly into the turbine exhaust flow discharging from the air cycle machine 10. Although the present invention will be described herein with reference to the four wheel air cycle machine of FIG. 1, it is to be understood that the present invention may be embodied in any turbomachine having an axial discharge turbine, including without limitation two or three wheel air cycle machines, and other turbomachines, such as turbochargers or the like, wherein it is desired to introduce a secondary flow into an axially directed primary turbine exhaust flow.

The air cycle machine 10 depicted in FIG. 1 has four distinct wheels coaxially disposed along a common shaft means 12 for rotation about a common longitudinal axis 14. A turbine wheel 30 is mounted to a first end portion 12a of the shaft means 12 for rotation therewith, a fan wheel 40 is mounted to a second end portion 12b of the shaft means 12 for rotation therewith, a compressor wheel 50 is mounted to a central portion 12c of the shaft means 12 in spaced relationship from the turbine wheel 30 and the fan wheel 40 for rotation therewith, and another turbine wheel 60 is also mounted to the central portion 12c of the shaft means 12 for rotation therewith at a location adjacent the compressor wheel 50 and between the other turbine wheel 30 and the compressor wheel 50.

The shaft 12 means comprises a first end shaft member 12a, a second end shaft member 12b and a central shaft member 12c disposed coaxially along the longitudinal axis 14. Each of the shaft members 12a, 12b and 12c comprise an annular sleeve defining an open ended hollow central cavity. The end Shaft members 12a and 12b are supported for rotation about the longitudinal axis 14 on bearing means 70 and 80, respectively. Each of the four wheels 30, 40, 50 and 60 has a hub portion having a plurality of rotor blades extending outwardly therefrom and a central opening extending axially therethrough to accommodate an elongated tie rod 16 extending along the longitudinal axis 14 through the central axial openings in the four wheels and through the hollow cavities of the shaft members. The tie rod 14 is bolted up at its ends to the outer wheels 30, 40 to axially clamp the four wheels and the shaft members together with sufficient axial clamping load that all four wheels and all shaft members rotate together as one integral wheel and shaft assembly.

The pair of spaced bearing means 70 and 80 are supported in a housing 100 which serves not only to support the bearing means, but also to provide appropriate inlet ducts and outlet ducts for the supply of working fluid to and the discharge of working fluid from each of the four wheels. The first bearing means 70 is disposed about the first end portion 12a of the shaft means 12 intermediate the turbine wheel 30 mounted to the first end 12a of the shaft means 12 and the turbine wheel 60 mounted to the central portion 12c of the shaft means 12, and the second bearing means 80 is disposed about the second end portion 12b of the shaft means 12 intermediate the fan wheel 40 mounted to the second end of the shaft means 12 and the compressor wheel 50 mounted to the central portion 12c of the shaft means 12. The bearing means 70 and 80 radially supporting the shaft and wheel assembly for rotation about the longitudinal axis 12 may comprise hydrodynamic journal bearings, such as for example gas film foil journal bearings of the type disclosed in commonly assigned U.S. Pat. Nos. 4,133,585; 4,247,155; and/or 4,295,689.

The air cycle machine 10 illustrated in the drawing is particularly suited for use in a condensing cycle air conditioning and temperature control system for cooling and dehumidifying air for supply to an enclosure for occupant comfort, such as the condensing cycle environmental control system for supplying cooled and dehumidified air to the cabin of an aircraft as disclosed in commonly assigned, U.S. Pat. No. 5,086,662. In this embodiment, the central turbine wheel 60 comprises a first stage turbine rotor and the outboard turbine wheel 30 comprises a second stage turbine rotor. The first and second stage turbine rotors 60 and 30 serve not only to expand and cool the air being conditioned, but also extract energy from the air being expanded for rotating the entire wheel and shaft assembly so to drive the fan rotor 40 and the compressor rotor 50.

The housing 100, within which the wheel and shaft assembly is disposed, is comprised of two or more sections to facilitate assembly. For example, the housing 100 may advantageously be comprised of three sections: a central section 110 surrounding the turbine rotor 60 and providing a first stage turbine inlet plenum 162 for supplying air to the turbine rotor 60 to be expanded therein and a first stage turbine outlet plenum 164 for discharging the exhaust air expanded in the turbine rotor 60; a first end section 120 surrounding both the compressor rotor 50 and the fan rotor 40 and providing an inlet plenum 152 for supplying air to the compressor rotor 50 to be compressed therein, an outlet plenum 154 for discharging air compressed via the compressor rotor 50, an inlet duct 142 for directing ram cooling air to the fan rotor 40 and an axially directed outlet passage 144 for discharging ram cooling air having passed through the fan rotor 40; and a second end section 130 surrounding the turbine rotor 30 and providing a second stage turbine inlet plenum 132 for supplying air to the turbine rotor 30 to be expanded therein, an axially directed second stage turbine outlet passage 134 for discharging the exhaust air expanded in the turbine rotor 30, and a turbine bypass flow inlet plenum 172. A turbine shroud 32 is disposed within the turbine inlet plenum 132 coaxially about the outboard turbine wheel 30. A turbine inlet nozzle 34 at the inboard end of the turbine shroud 32 extends circumferentially about the inlet portion of the turbine wheel 30 for directing air flow from the inlet plenum 132 into the blades 33 of the turbine wheel 30. At the outboard end of the turbine shroud 32, an outlet diffuser 36, which advantageously may comprise a diverging sleeve-like extension of the turbine shroud 32, may be provided so as to extend axially outboardly therefrom to define an axially directed discharge passage 136 through which the chilled turbine exhaust air passes from the turbine wheel 30 through the turbine outlet 134.

The central housing section 110 is mounted at one of its ends to the end housing section 130 by a plurality of circumferentially spaced bolts 102 attaching a flange of the central section 110 to a flange of the end section 130, and at its other end to the end housing section 120 by a plurality of circumferentially spaced bolts 104 attaching a flange of the central section 110 to a flange of the end section 120. The central disc member 114 which is disposed about the central shaft member 12 and extends therefrom outwardly between the central housing section 110 and the housing section 120, serves to separate the air flow circuit associated with the compressor rotor 50 from the air flow circuit associated with the turbine rotor 60.

Figure 2:
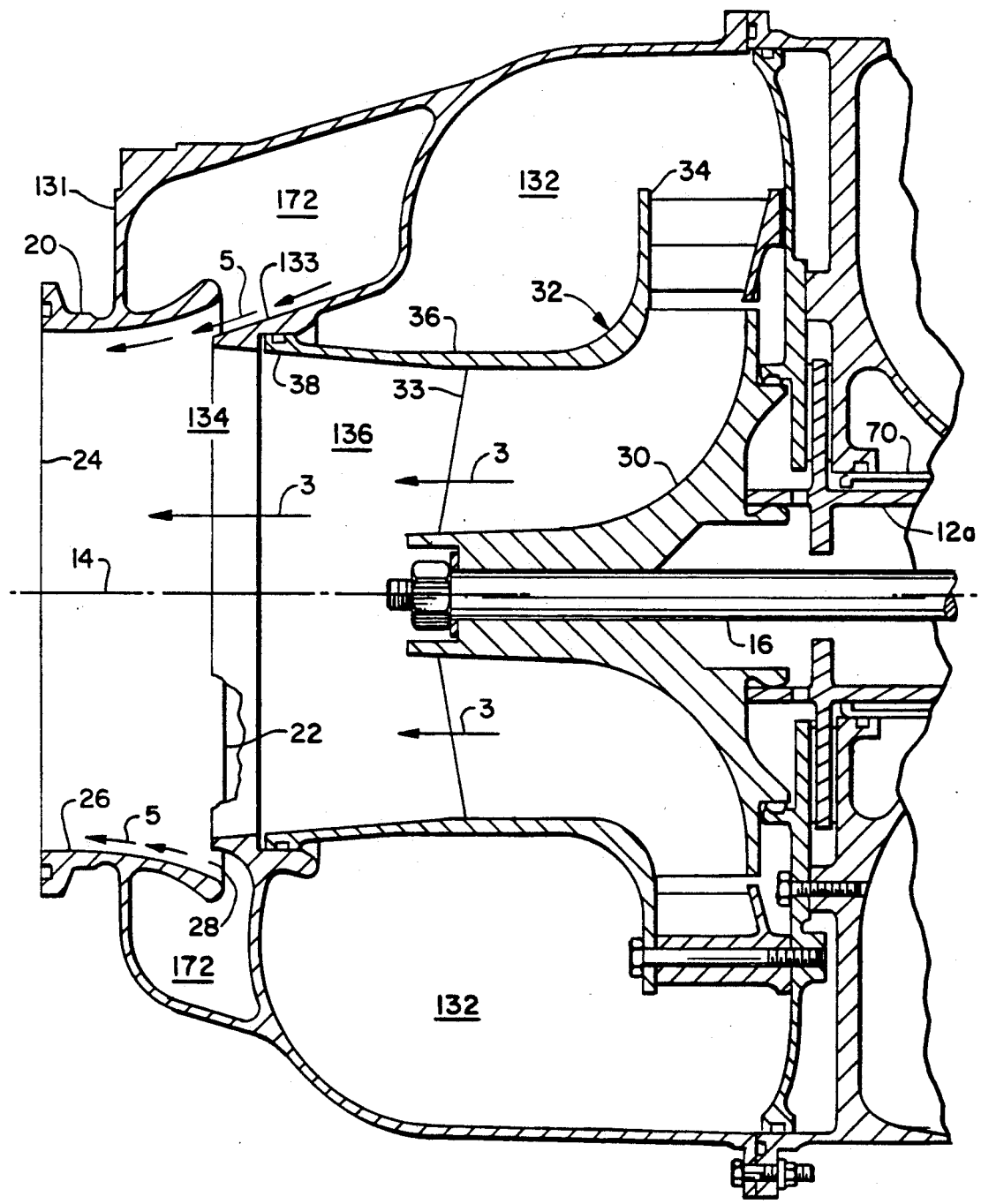
FIG. 2 is an enlarged side elevational view, partly in section, of the region 2—2 of the embodiment of the air cycle machine of the present invention illustrated in FIG. 1.
Figure 3:
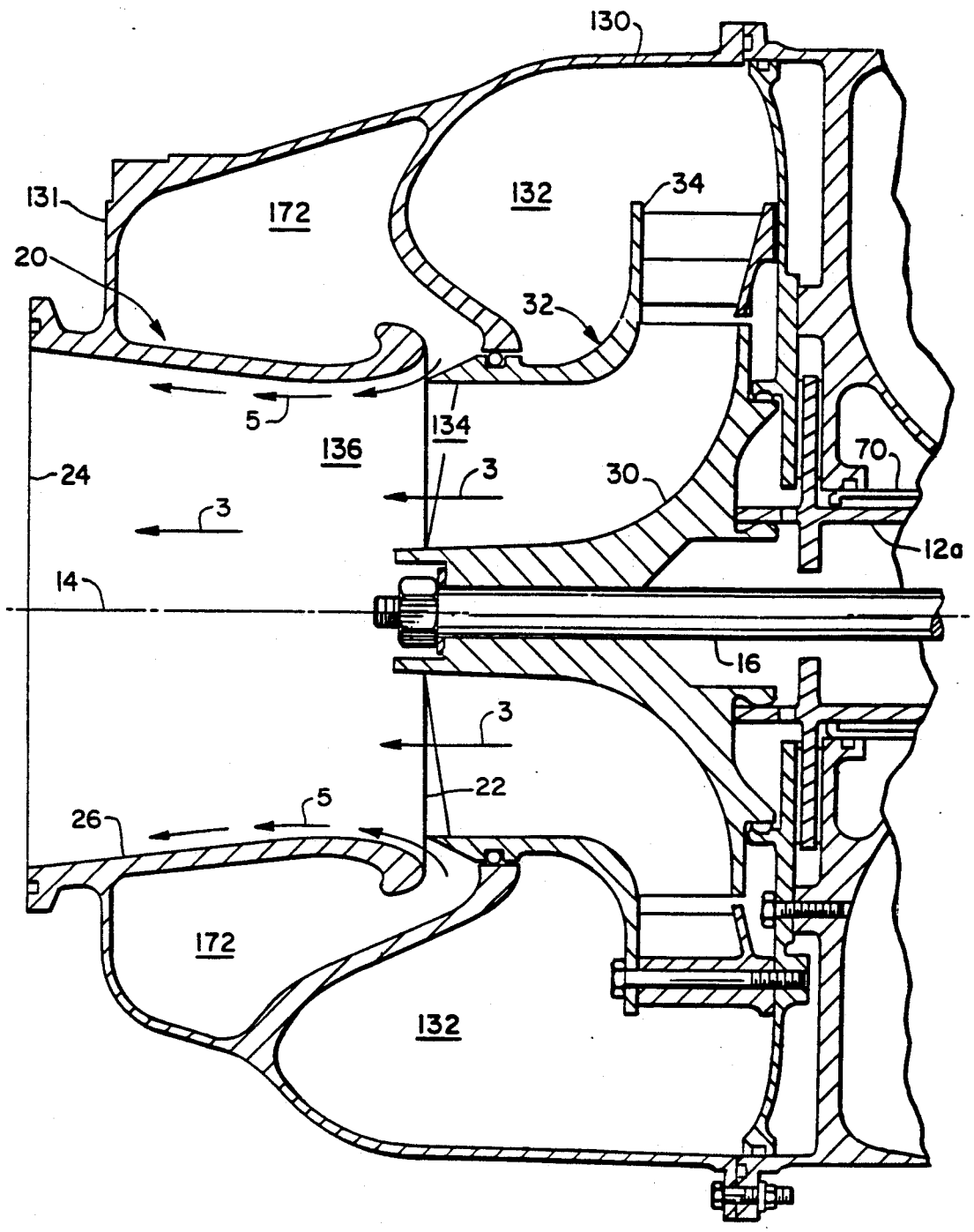
FIG. 3 is an enlarged side elevational view, partly in section, of an alternate embodiment of the region 2—2 of the air cycle machine of FIG. 1.

Referring now to FIGS. 2 and 3, a bypass air discharge nozzle 20 is disposed centrally in the end face 131 of the housing section 130 and extends coaxially along the axis 14. The bypass air discharge nozzle 20 has an inlet opening 22 at its inboard end, an outlet opening 24 at its outboard end and an annular sleeve-like wall portion 26 extending therebetween. The inlet opening 22 is disposed coaxially with the turbine shroud 32 so as to receive in a central region thereof the chilled turbine exhaust flow 3 having discharged from the turbine wheel 30 through the turbine outlet 134 and to define an annular flow inlet passage 28 about the outlet passage 134. The annular flow inlet passage 28 opens to the turbine bypass flow plenum 172 to receive a flow 5 of bypass air therefrom. The wall portion 26 of the bypass flow discharge nozzle 20 is contoured so as to direct the turbine bypass flow 5 passing through the annular inlet passage 28 from the bypass flow plenum 172 therealong, whereby the turbine bypass flow 5 passes through the bypass flow discharge nozzle 20 substantially parallel to the turbine exhaust 3 discharging from the turbine.

In the embodiment of the turbomachine of the present invention illustrated in FIGS. 1 and 2, the turbine shroud 32 includes an outlet diffuser 36 comprising a diverging conical sleeve formed integrally with the turbine shroud 32 and extending axially outboardly from an inlet end at the outlet 134 of the turbine 30 to an outlet end 38 disposed in a central opening in an inner end wall 133 of the housing 130 so as to define an axially directed discharge passage 136 opening to the turbine outlet 134 to receive the chilled turbine exhaust flow 3 discharging from the turbine wheel 30. In this embodiment, the bypass flow discharge nozzle 20 is mounted in the end wall 131 of the housing section 130 with its inlet opening 22 disposed at the outlet end 38 of the turbine diffuser 36 so as to receive in the central region thereof the chilled turbine exhaust flow 3 passing from the turbine diffuser 36 through the discharge passage 136 and to define an annular flow inlet passage 28 opening to the turbine bypass flow plenum 172 to receive a flow 5 of bypass air therefrom.

In the embodiment of the turbomachine of the present invention illustrated in FIG. 3, the turbine shroud 32 does not include an outlet diffuser, but rather terminates at the turbine outlet 134. In this embodiment, the bypass flow discharge nozzle 20 is mounted in the end wall 131 of the housing section 130 with its inlet opening 22 disposed at the outlet 134 of the turbine wheel 30 so as to receive directly therefrom into its central region the chilled turbine exhaust flow 3 passing from the turbine wheel 30 and to define an annular flow inlet passage 28 about the turbine outlet 134 which opens to the turbine bypass flow plenum 172 to receive a flow 5 of bypass air therefrom. As illustrated in FIG. 3, the sleeve portion 26 of the bypass flow discharge nozzle 20 diverges outwardly from its inlet end 22 to its outlet end 24. Thus, the bypass flow discharge nozzle 20 effectively also serves as a diffuser, thereby eliminating the need for a distinct turbine diffuser extending outboardly from the outlet end of the turbine shroud 32.

Whether admitted about the chilled turbine exhaust flow at the outlet 134 of the turbine wheel 30 or downstream thereof at the end of a turbine diffuser 36 extending outboardly therefrom, the relatively warm turbine bypass flow 5 passes through the discharge nozzle 20 as an outer annular flow stream about a core flow of the chilled turbine exhaust 3 passing axially through a central region of the nozzle 20 substantially parallel to the axis 14. The relatively warm turbine bypass flow 5 thereby shields the wall 26 of the nozzle 20 from the chilled turbine exhaust flow 3 and prevents ice particles from being formed by moisturizing depositing thereon even if the chilled turbine exhaust drops below the freezing point. Additionally, as the relatively warm turbine bypass flow 5 is directed through the nozzle 20 substantially parallel to and about the chilled turbine exhaust, the relatively warm turbine bypass flow will also flow along and thereby shield the wall of any downstream ductwork into which the discharge flow from the air cycle machine 10 is directed, thus preventing icing thereof. Since the turbine bypass flow forms a warming layer along the wall of the nozzle 20 and any downstream ductwork, it is no longer necessary to rapidly mix the relatively warm turbine bypass flow into the chilled turbine exhaust in order to rapidly raise the overall flow temperature to prevent icing as commonly done in the prior art. Rather, in the air cycle machine of the present invention, the outer flow of turbine bypass flow will gradually mix with the inner flow of chilled turbine exhaust, thereby avoiding the noise generated by the resultant turbulence created when the bypass flow stream is introduced substantially perpendicularly into the turbine exhaust flow as in the prior art in order to induce rapid mixing of two streams.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A turbomachine having at least a compressor wheel and a turbine wheel mounted to a common shaft for rotation therewith, said turbine wheel being operative to extract energy from a flow of compressed working fluid for driving the shaft in rotation about a longitudinally extending axis, said turbine wheel mounted to an end portion of the shaft and having a fixed stator and an outlet for directing an exhaust flow discharging from said turbine wheel along said axis, said turbomachine characterized by a bypass flow nozzle disposed coaxially about said longitudinal axis and extending coaxially along said axis, said bypass flow nozzle having a nozzle inlet including a central region for receiving the turbine exhaust flow passing from said turbine wheel outlet and an outer annular region extending circumferentially about said central region for receiving a flow of working fluid having bypassed said turbine wheel, whereby said received turbine bypass flow passes through said outer annular region as an outer annular flow stream passing substantially parallel to and about the turbine exhaust flow passing through said central region, and a nozzle outlet for directing the received turbine exhaust flow and the received turbine bypass flow therethrough.

2. A turbomachine as recited in claim 1 further characterized in that said outer annular region of said nozzle inlet has a sleeve-like wall extending coaxially about said axis between said nozzle inlet and said nozzle outlet, said wall being contoured in the direction of flow therethrough whereby said received turbine bypass flow is directed to pass through said outer annular region of said nozzle inlet and discharge through said nozzle outlet as an outer annular flow stream passing substantially parallel to and about the turbine exhaust flow.

3. An air cycle machine for conditioning air for supply to an enclosure, comprising:
    shaft means disposed for rotation about a longitudinally extending axis;
    bearing means for supporting said shaft means for rotation about said axis;
    a turbine wheel mounted to a first end portion of said shaft means for rotation therewith, said turbine wheel operative to expand the conditioning air passing therethrough thereby cooling the expanded conditioning air and extracting energy therefrom for driving said shaft means in rotation about said axis, said turbine wheel having a fixed stator and an outlet for directing the cooled expanded conditioning air discharging from said turbine wheel along said axis; and
    a bypass flow nozzle disposed coaxially about said axis and extending coaxially along said axis, said bypass flow nozzle having a nozzle inlet including a central region for receiving the cooled expanded conditioning air passing from said turbine wheel outlet and an outer annular region extending circumferentially about said central region for receiving a flow of relatively warm air having bypassed said turbine, whereby said received bypass air flow passes through said outer annular region as an outer annular flow stream passing substantially parallel to and about the cooled expanded conditioning air passing through said central region, and a nozzle outlet for directing the received turbine exhaust flow and the received turbine bypass flow therethrough.

4. An air cycle machine as recited in claim 3 wherein said outer annular region of said nozzle inlet has a sleeve-like wall extending coaxially about said axis between said nozzle inlet and said nozzle outlet, said wall being contoured in the direction of flow therethrough whereby said received bypass air flow is directed to pass through said nozzle inlet and discharge through said nozzle outlet as an outer annular flow stream passing substantially parallel to and about the cooled expanded conditioning air.

5. An air cycle machine as recited in claim 3 further comprising a housing disposed about said shaft means and said turbine wheel, said housing supporting said bypass flow discharge nozzle and defining an annular bypass flow discharge nozzle and defining an annular bypass air flow inlet plenum for receiving the bypass air flow, the inlet plenum opening to the outer annular region of said nozzle inlet.

* * * * *